United States Patent [19]
Kretschmer et al.

[11] 3,736,749
[45] June 5, 1973

[54] OPEN LOOP ON-DEMAND VARIABLE FLOW GAS GENERATOR SYSTEM WITH A TWO-POSITION INJECTOR

[75] Inventors: Willi K. Kretschmer, Santa Cruz; Paul A. Heady, Jr., Mount Herman, both of Calif.

[73] Assignee: Lockheed Missiles & Space Company, Inc., Sunnyvale, Calif.

[22] Filed: Aug. 20, 1971

[21] Appl. No.: 173,508

[52] U.S. Cl. ........... 60/39.74 A, 60/39.82 E, 60/229, 60/258
[51] Int. Cl. ................................ F02k 9/02
[58] Field of Search .................. 60/39.74 A, 258, 60/229, 243, 200, 39.48

[56] References Cited
UNITED STATES PATENTS

| | | |
|---|---|---|
| 3,544,061 | 12/1970 | Moy ........................... 60/258 |
| 3,308,619 | 3/1967 | Richardson et al ............ 60/258 |
| 3,323,308 | 6/1967 | Greco ........................ 60/39.48 |
| 3,462,950 | 8/1969 | Chevalaz ................. 60/39.74 A |
| 3,665,710 | 5/1972 | Ficon et al ................... 60/258 |

Primary Examiner—Carlton R. Croyle
Assistant Examiner—Warren Olsen
Attorney—R. S. Sciascia and Charles D. B. Curry

[57] ABSTRACT

An open loop on-demand generator system with a two-position injector to provide a variable gas flow for a reaction control system. The injector system includes two two-position injectors located on opposite sides of the gas generator to provide a constant pressure to match the flow demand for each thrust step. Each injector includes a swirl device to provide swirled fuel at idle flow as well as maximum demand flow. Each injector also provides four intermediate thrust steps between idle flow and maximum demand flow.

10 Claims, 7 Drawing Figures

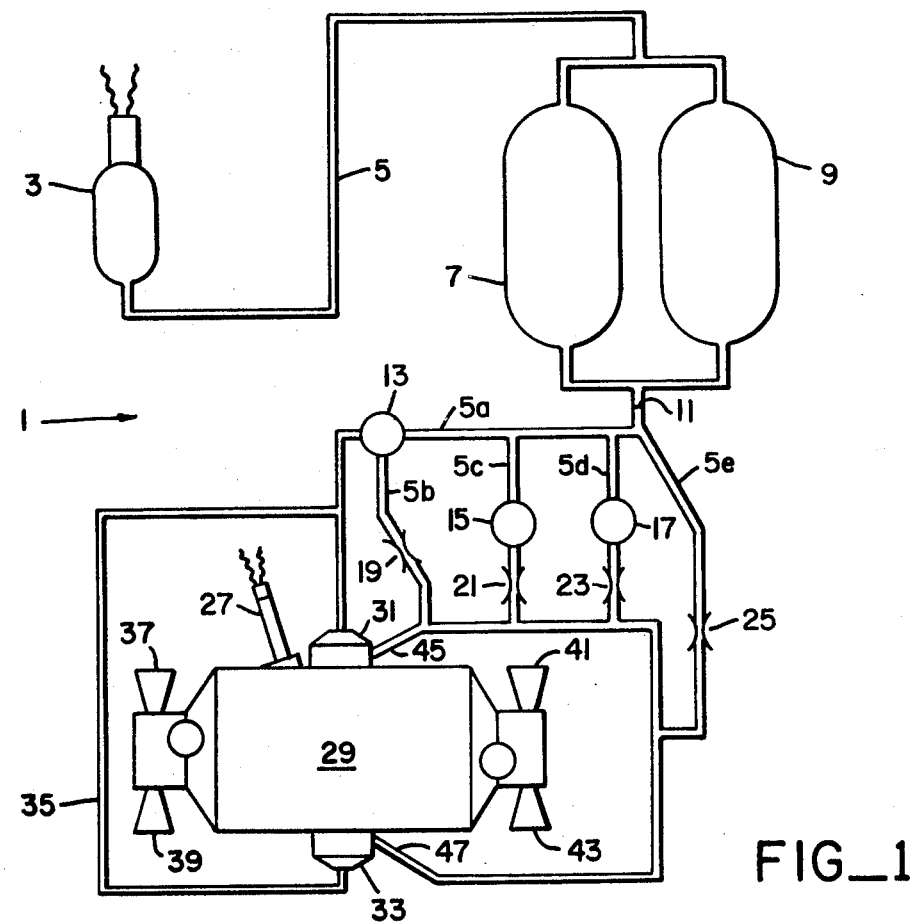
FIG_1
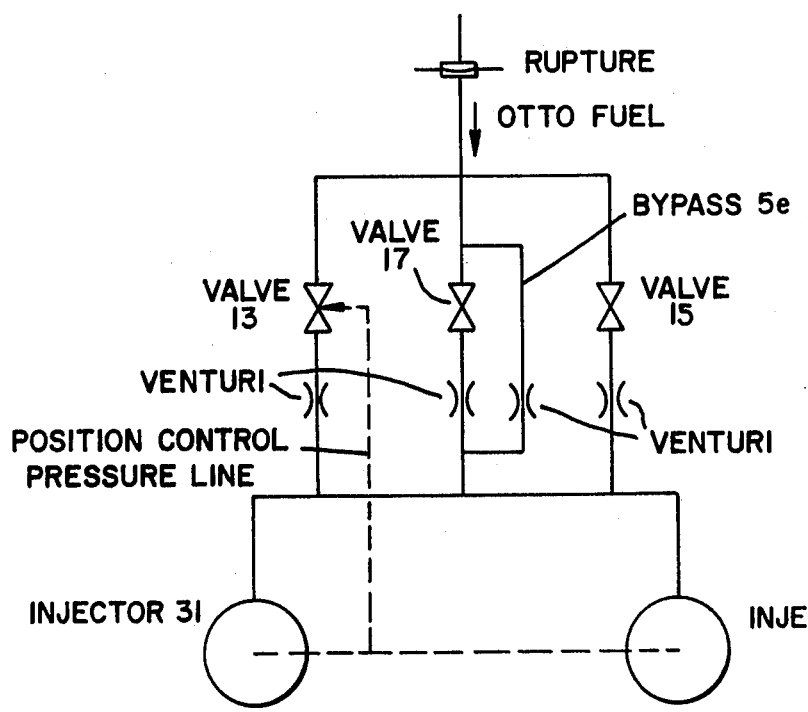
FIG_6

PATENTED JUN 5 1973 3,736,749
SHEET 2 OF 3
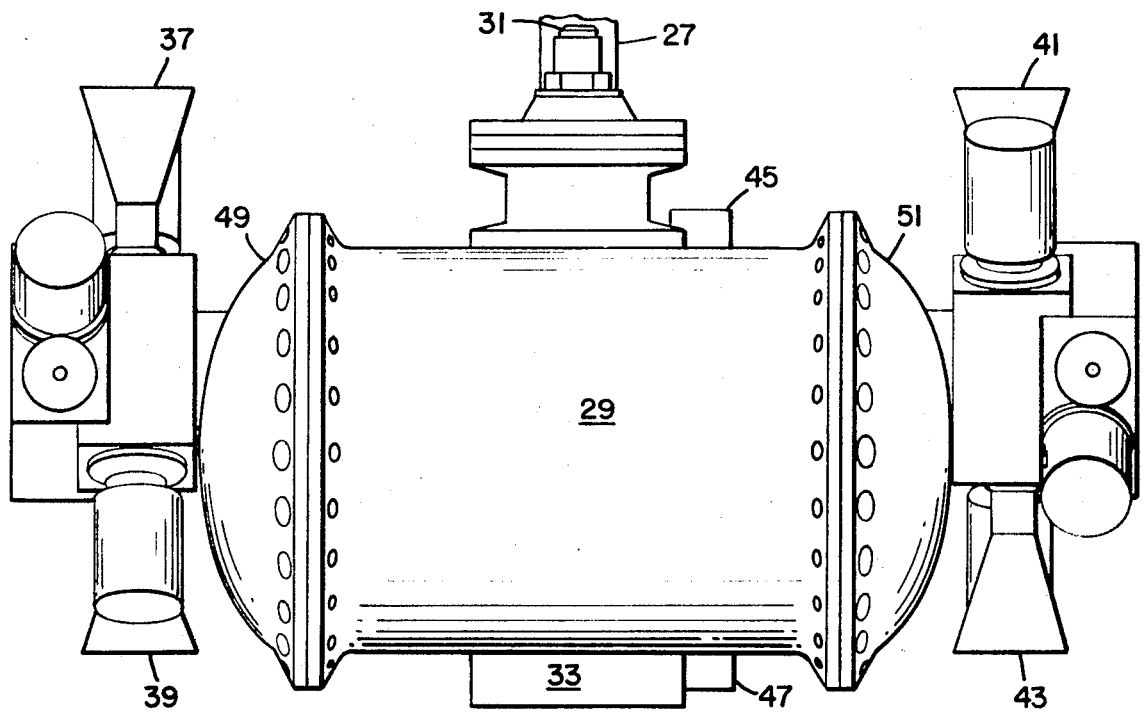
FIG_2
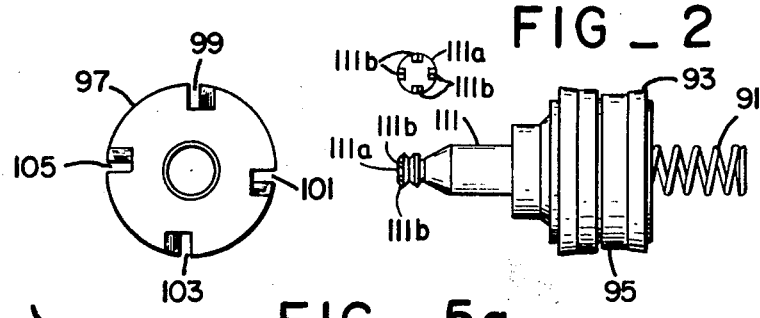
FIG_5a
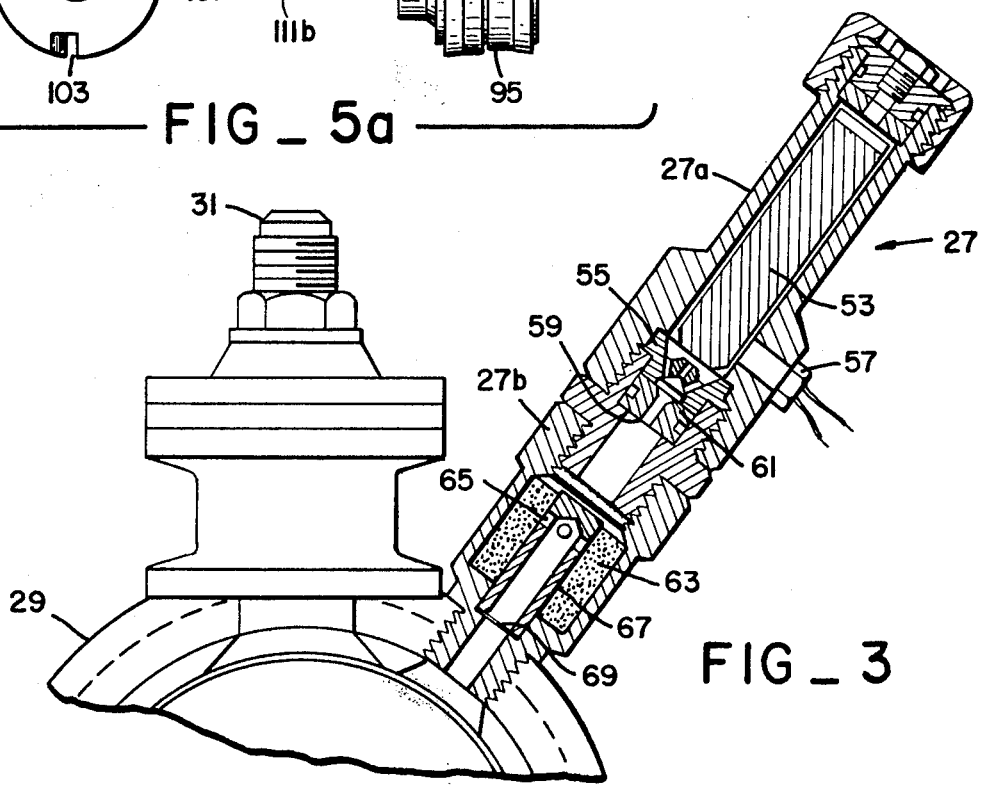
FIG_3

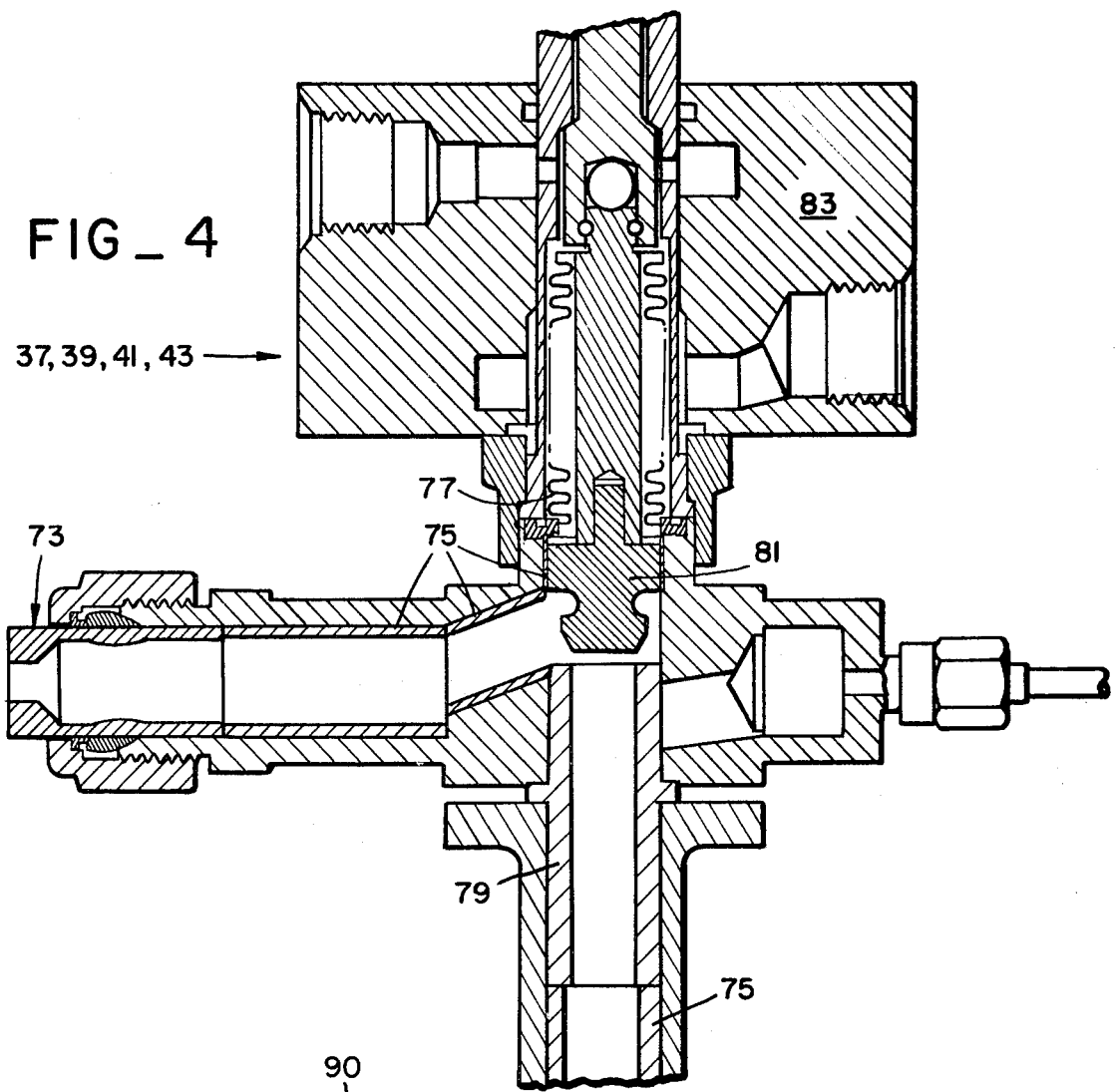
FIG_4
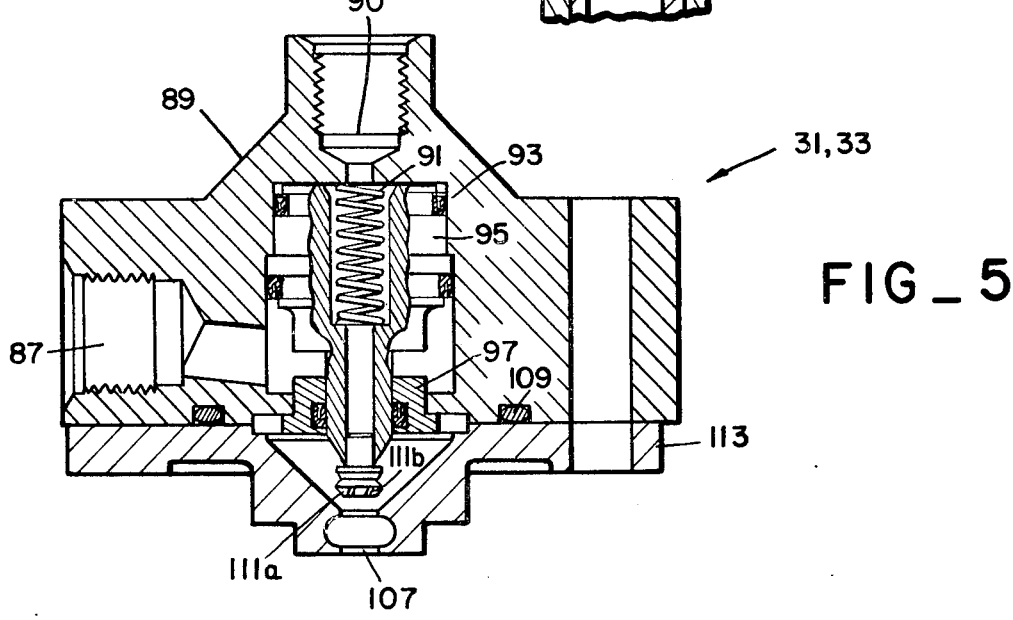
FIG_5

OPEN LOOP ON-DEMAND VARIABLE FLOW GAS GENERATOR SYSTEM WITH A TWO-POSITION INJECTOR

BACKGROUND OF THE INVENTION

1. Field of the Invention

The invention relates generally to an on-demand continuous flow gas generator system and more particularly to a bipropellent open loop on-demand fuel feeding system with a two-position injector device to match the flow demand with each thrust step which is initiated by the gas valves.

2. Description of the Prior Art

Previous systems to vary flow required a multitude of single-position fixed area injectors with the additional capability of switching the injectors on or off in order to maintain enough injector differential pressure ($\Delta P$) for atomization. Moreover, the use of a multiple number of single-position fixed area conical spray injectors required additional valves to isolate the injectors at low flow demands.

SUMMARY OF THE INVENTION

The present invention overcomes the aforementioned problems by reducing the number of valves and injectors while maintaining continuous flow through the injectors. Moreover, the unique system is simple, fully automatic and can be used with most monopropellent or bipropellent propulsion systems. The invention embodies an open loop system including a two-position fixed area injector which works on the principle that for each thrust step, which is initiated by the operating gas valves, a propellent valve is actuated to match the flow demand to maintain a constant pressure and continuous flow.

An alternative embodiment involves a closed loop system including a swirl type variable area injector which maintains a continuous fuel flow through the injector throughout the entire operating cycle. The subject matter of the aforementioned invention is disclosed in copending application, U.S. Pat. application Ser. No. 173,510 by Willi K. Kretschmer and Paul A. Heady, Jr.

STATEMENTS OF THE OBJECTS OF THE INVENTION

A primary object of the present invention is to provide an open loop system including a fixed-area injector which will maintain continuous fuel flow under constant pressure.

Another object of the present invention is to provide a simple, automatic, open loop-propellent system which is capable of being used with most monopropellent or bipropellent liquid propellent systems.

Other objects, advantages and novel features of the invention will become apparent from the following detailed description of the invention when considered in conjunction with the accompanying drawings.

BRIEF DESCRIPTION OF THE DRAWINGS

FIG. 1 is a schematic drawing of the open loop system including the two unique two-position opposed injectors;

FIG. 2 is a drawing of the gas generator wherein the warm gas valves, shown in FIG. 1, are replaced with the two injector thruster valve clusters fitted to the domes;

FIG. 3 is an illustration of the igniter used in the open loop system shown in FIG. 1;

FIG. 4 is an illustration of the warm gas valve shown in FIG. 1, which replaces valve clusters shown in FIG. 2;

FIG. 5 is an illustration of one of the two-position injectors used in open loop system shown in FIG. 1;

FIG. 5a is a detailed drawing of the swirl plate and swirler tip with piston of injector shown in FIG. 5; and FIG. 6 is a fuel flow schematic of the operational open loop system shown in FIG. 1.

DESCRIPTION OF THE PREFERRED EMBODIMENTS

There are two somewhat similar on-demand gas generators, namely, the closed loop system with a variable area injector and the open loop system with two oppositely opposed two-position injectors.

The closed loop system, which is the subject matter of the aforementioned copending application, is also simple and requires few components. The variable area injector of the closed loop system combines a flow regulation valve and a spring-loaded bellows into one integrated unit. Flow changes in the injector are initiated by a chamber pressure $P_c$ decrease or increase through changes in gas flow demand by switching gas valves on or off. The pressure drop across the injector for different flow rates varies within a relatively narrow band and the $P_c$ pressure changes are equal to the differential pressure ($\Delta P$) variation.

In contrast, the open loop system with the two-position injector shown in FIG. 1, which is the subject matter of the present invention, works on the principle that for each thrust step, which is initiated by the operating gas valves, a propellent valve is required to match the flow demand to maintain constant $P_c$ pressure. The two-position injector, shown in FIG. 5, reduces the number of valves normally required to three and maintains continuous flow through the injector at an injection $\Delta P$ of approximately 35 psi, or above, for six independent thrust steps.

The open loop device 1 with the two-position injector systems, shown in FIG. 1, includes squib 3, pressurization line 5, Otto Fuel tanks 7 and 9, burst disc 11, control valves 13, 15 and 17, venturis 19, 21, 23 and 25, igniter 27, gas generator 29, two-position propellent injectors 31 and 33, piston position control pressure line 35, and four thruster valves 37, 39, 41 and 43. Control valves 13, 15 and 17 are commonly connected to each other through pressurization lines 5a, 5c and 5d, respectively. Valve 13 is a three-way valve positioned so that when the valve is closed, fuel will flow into position pressure line 35 and when valve 13 is opened, the fuel will flow only through line 5b. The ignition of the Otto Fuel can be accomplished by an electric preheater or with the unique solid igniter 27, the details of which are shown in FIG. 3. The latter device is more desirable because ignition must be instantaneous. Therefore, to facilitate an overall understanding of the unique system, a discussion of the solid igniter, shown in FIG. 3, follows.

Referring to FIG. 3, the pyrogen solid igniter comprises a filter 55, squib 57, foil discs 59 and 69, nozzle 61, burst disc 65 and stand pipe 67. The propellent grain 53 is located in the inner upper body 27a of igniter 27 while ball powder 63 circumferentially surrounds burst disc 65 and stand pipe 67. To obtain a rapid gas generator pressure rise from solid igniter 27, smokeless powder is used as a booster because it has a high burning rate and is an excellent gas producer. To maintain the pressure level a non-perforated external burning cylindrical propellant grain 53 is simultaneously ignited with the powder 63, which continues to burn for about 0.4 seconds. The igniter 27 consists of two chambers 27a and 27b which are internally separated by foil rupture disc 59. The upper chamber 27a includes igniter nozzle 61 and filter 55. Igniter assembly 27 is threaded into gas generator 29, as shown in FIGS. 1 and 3, in the plane of injector 31, and is tilted at an angle of about 30° to the axis of the injector 31 to provide a precise convergence between the fuel from the injectors 31 and 33 and the ignited powder from the igniter, for optimum combustion. The lower chamber 27b has a burst disc 65 and a stand pipe 67 which prevent the loss of powder 63 into gas generator 29 before burning and during ignition. The unique igniter is further described in copending patent application, U.S. Pat. application Ser. No. 173,510, by Willi K. Kretschmer and Paul A. Heady, Jr.

Referring now to FIG. 2, gas generator 29 comprises a cylindrical section 29 and two domed ends 49 and 51 and thruster cluster valves 37, 39, 41 and 43 of the thruster cluster. Each of the thruster cluster valves includes thruster nozzles which fit directly on the domes 49 and 51, thus making the system compact. The location of valves 37, 39, 41 and 43, on both sides of the domes, is an integrated design. It should be noted that for a fixed test stand operation or when the system is used in cooperation with a drone aircraft, four warm gas valves, similar to the gas valve shown in FIG. 4, may be used instead of the more conventional thruster cluster.

To protect the chamber walls and domes from overheating, a silica phenolic insulation or other similar materials can be used on the interior surfaces thereof. The two identical propellant injectors 31 and 33 are mounted on opposite sides and in the center of cylindrical section 29. Fuel inlet 45 is connected to injector 31 and fuel inlet 47 is connected to injector 33 to allow the flow of Otto Fuel from Otto Fuel tanks 7 and 9 through the respective lines, through inlets 45 and 47, and then direct to injectors 31 and 33. The generator chamber walls may be lined with a spiral-wound 0.2-inch-thick silica phenolic liner split into halves, each half being placed with the windings in opposite directions. This insures gas flow over the liner in the direction of the spiral windings, preventing delamination. Each dome may be lined with silica phenolic liner which has three holes with attached welded stainless steel extension pipes; two of them can be lined with thin columbium piping. Fitted to the pipe extensions may be four warm gas valves, identical to the single gas valve shown in FIG. 4. The cylindrical liner halves and the dome liners are provided with holes for inlet and outlet passages. Chamber ports can be provided for temperature and pressure measurements. The igniter and injectors are threaded and flanged, respectively, to the cylindrical section. The gas generator can be fitted with two nichrome wire screens to prevent nozzle blockage by contaminants, which can be mounted at the ends of the cylindrical section and supported in one axis by a semi-tubular columbium metal piece. For a further description of the gas generator see the aforementioned copending patent application.

In FIG. 4 is illustrated warm gas valves 37, 39, 41 and 43. Each gas valve is identical in structure and function and hence a description of one will be deemed applicable to all. Each of the gas valves comprises a water cooling manifold 83, bellows 77, poppet head 81, a seat insert liner 75 and 79, and nozzle 73. Each valve has a sealed pneumatic valve bellows 77 with an operational gas temperature of about 1,500° F at about 1,500 psig pressure. All gas passages are lined with columbium material and the valve seat insert liner 79 and poppet head 81 are also made of columbium material. The bellows are connected to the valve poppet head 81 and act as a sealing device. The water cooling manifold 83 functions to cool the bellows and is a standard system well known in the art. Nozzle 73 is installed downstream from the warm gas valve. The propellant is injected during peak pressure of the igniter burn. Moreover, the valve opening can be initiated by a time switch instead of chamber pressure.

The open loop system in FIG. 1 works on the principle that for each thrust step, which is initiated by operating gas valves, a propellant valve is required to match the flow demand to maintain constant $P_c$ pressure. The two-position injector of the present invention reduces the number of valves and maintains continuous flow through the injector at an injection $\Delta P$ of about 35 psi, or above, for six thrust steps. The two-position injectors 31 and 33, as shown in FIG. 1, are designed to meet the requirements for six thrust steps and flow rates with the minimum number of injectors at an injection $\Delta P$ of not less than 35 psi.

Referring to FIGS. 5 and 5a, two-position injectors 31 and 33 each comprise a fuel inlet 87, a housing 89, piston top 90, spring 91, seal 93, piston 95, swirl plate 97, O ring 109, spraying system swirler tip shaft 111, base plate 113 and toroidal shaped fuel discharge aperture 107. The system accomplishes its various functions by using two injectors, 31 and 33, each having a piston 95 and tangentially slotted swirler tip 111a which is held in the down-position by spring force and by fuel pressure at piston top 90. Since injectors 31 and 33 are structurally and functionally alike, a description of one injector will be deemed to apply to both. During operation piston 95 and swirler tip 111a are maintained in the down-position by supplying propellent pressure to the piston top 90 of the piston 95. By venting the propellent pressure, that is, by opening valve 13 of FIG. 1 to shut off fuel from line 35, the fuel pressure is directed through fuel inlet 87, below piston 95 and tip 111a, thus overcoming the spring force and thereby causing piston 95 to move to the up-position. The two-position injectors 31 and 33 both produce a hollow cone spray. When the flow is about 120 pounds of thrust, swirl plate 97, having four tangential slots 99, 101, 103 and 105, generates a nominal swirl in base plate 113. The optimum performance is between about 0.5 and about 0.6 lb/sec of flow.

This venting is dependent on the position of control valves 13, 15 and 17, shown in FIG. 1, that is, whether the fuel is being directed through pressure lines 35 or through lines 5b, 5c, 5d or 5e. These valves may be solenoid controlled if desired and can be initiated by a time switch instead of chamber pressure.

FIG. 5a shows the construction of the swirl plate 97 with its four tangential slots 99, 101, 103, 105, as well as the spraying system swirler tip shaft 111. The tip 111a has a plurality of tangential slots 111b as illustrated in FIGS. 5 and 5a. The tip 111a and slots 111b are structurally similar to swirl plate 97. This incorporation allows a good fuel spray in the down-position so there is a continuous flow of fuel in either the up or down-position.

Referring to FIGS. 1 and 5, a discussion of the operation of the closed loop system with the two-position injectors follows. When three-way valve 13 is normally closed, Otto Fuel flowing through piston position control pressure line 35 compresses piston top 90 of pistons 95 in both injectors so that swirler tips 111a protrude into upper opening of fuel discharge aperatures 107, thus limiting amount of fuel exiting from both injectors into chamber 29 to the flow allowed by the tangetial slots 111b. When three-way valve 13 is open to line 5b, but closed to line 35, the fuel flows through fuel inlet lines 45 and 47 to fuel inlet 87 of injectors 31 and 33, respectively. This causes both of injector valves 31 and 33 to open a predetermined amount. Venturis 19, 21, 23, 25 increase the velocity of the fuel flow to injectors 31 and 33. When valves 15 and 17 are opened, respectively, the injector increases in six incremental thrust steps of 2:1 or a total from 40 pounds to 240 pounds or 6:1 overall range.

FIG. 6, when compared with Table I, will illustrate the operation of the dual two-position injectors of the open loop system. Valves 17, 13 and 15 of FIG. 6 correspond to valves 17, 13 and 15, respectively, of FIG. 1. Table I is shown to illustrate thrust step functions.

TABLE I

| Thrust | 40 | 80 | 120 | 160 | 200 | 240 |
|---|---|---|---|---|---|---|
| Valve | 0 | 0,17 | 0,13 | 0,17,13 | 0,13,15 | 0,17,13,15 |
| Injector Position | down | down | up | up | up | up |
| Injector P (psi) | 35 | 140 | 35 | 62 | 97 | 140 |

A discussion of the system operation in conjunction with FIG. 1, FIG. 2 and Table I follows. When all of the valves are closed, injectors 31 and 33 are held in the down, or idle flow position by piston position control pressure while fuel is being directed through bypass line directly to fuel inlets of injectors 31 and 33. When the system is at idle flow, the swirled fuel from injectors 31 and 33 provide 40 pounds of thrust. When two-way valve 17 is opened, the fuel position control pressure continues to hold the pistons of injectors 31 and 33 in the down-position, but the thrust will increase to 80 pounds due to the increased volume and velocity of the Otto Fuel. However, when valve 13 is opened, the fuel being directed through fuel position control pressure line 35 is shut off so that the piston is held in the down-position by spring force, which will be subsequently overcome by the fuel flowing through valve 13 to the underside of the pistons of injectors 31 and 33. The thrust will increase to 120 pounds in this configuration. When valves 17 and 15 are opened, in conjunction with valve 13 in the specific configurations illustrated in Table I, the thrust will continue to increase by an incremental thrust step factor of 2. The maximum thrust is 240 pounds with all three valves open. From idle flow to maximum demand flow the factor is 6. As described above, the fuel is continuously discharged from the discharge aperature into the gas generator chamber where the atomized fuel is directed to the proper thruster valves, or to the proper warm gas valves, as the case may be. We can see that the unique two-position open loop injector system reduces the number of valves required to maintain continuous flow through the injectors at an injector differential pressure of about 35 psi, or above, for six different thrust steps. This type of configuration prevents complete shut-off of the system when going from idle to demand flow.

What is claimed is:

1. An open loop on-demand gas generator system with a dual two-position injector to provide a variable gas flow for a reaction control system and including fuel providing means; a gas generator; an igniter to supply ignition material; and hot gas valves with gas nozzles; said dual two-position injector each comprising in combination:
   a. a hollow housing;
   b. a piston located inside said hollow housing;
   c. a propellant pressure means located at one end of said piston and intermittently operatively connected to said fuel providing means;
   d. a fuel inlet opening into the hollow portion of said housing and intermittently operatively connected to said fuel providing means when said fuel providing means is not providing fuel pressure to propellant pressure means;
   e. a continuous fuel swirling discharge means opening into said gas generator and located in alignment to be ignited by said igniter;
   f. said piston having means for intermittently extending into said discharge means whereby said extension is extending into said discharge means when said fuel providing means is providing fuel to said fuel providing means; and
   g. a variable means for swirling the fuel into said gas generator located in said housing and structurally encompassing said piston and adjacent said discharge means whereby when said fuel providing means is providing fuel to said inlet opening said fuel is discharged into said discharge means.

2. The device recited in claim 1 wherein said swirler means is a swirler plate extending across said discharge means, said swirler comprising a plurality of angular tangential slots wherein said slots swirl said fuel into said discharge means when said piston extending means is in the up-position or down-position.

3. The device recited in claim 2 wherein said extending means is located in a swirler tip and said swirler plate includes an aperture in the center of said plate to accept said swirler tip, said swirler tip further extending into said discharge means.

4. The device recited in claim 1 wherein said discharge means is a base plate attached to the bottom of the injector housing, said discharge means having a toroidal aperature which opens onto the gas generator, said swirler tip being larger than said aperature whereby said tip, when in the down-position, closes said aperature and limits the amount of fuel flow into said gas generator.

5. The device recited in claim 4 wherein said swirler tip is tangentially slotted to provide nominal fuel flow when said swirler tip closes off said aperature.

6. The device recited in claim 5 wherein said swirler tip is angularly tangentially slotted with a plurality of slots whereby said fuel is swirled when said fuel is being directed into the propellant pressure means.

7. The device recited in claim 1 wherein said igniter is tilted at an angle of about 30° to one injector to provide a precise converging locus between the fuel from the injector and the ignition material from the igniter.

8. The device recited in claim 1 wherein said piston and said extension are held in the closed position by spring force.

9. The device recited in claim 8 wherein said piston and said extension remain in the closed position by propellent pressure on the top of said piston.

10. The device recited in claim 9 wherein said piston is moved into the by open position venting said propellent pressure below said piston.

* * * * *

UNITED STATES PATENT OFFICE
CERTIFICATE OF CORRECTION

Patent No. 3,736,749                      Dated June 5, 1973

Inventor(s) Willi K. Kretschmer et al.

It is certified that error appears in the above-identified patent and that said Letters Patent are hereby corrected as shown below:

On the cover sheet [73] "Lockheed Missiles & Space Company, Inc., Sunnyvale, Calif." should read -- The United States of America as represented by the Secretary of the Navy --.

Signed and sealed this 26th day of March 1974.

(SEAL)
Attest:

EDWARD M. FLETCHER, JR.                C. MARSHALL DANN
Attesting Officer                      Commissioner of Patents